(12) United States Patent
Zheng et al.

(10) Patent No.: US 11,293,860 B2
(45) Date of Patent: Apr. 5, 2022

(54) TERAHERTZ SPECTRAL IMAGING DATA RECONSTRUCTION METHOD, APPARATUS, DEVICE, AND STORAGE MEDIUM

(71) Applicant: TSINGHUA UNIVERSITY, Beijing (CN)

(72) Inventors: Xiao-Ping Zheng, Beijing (CN); Bin Cao, Beijing (CN); Hua Geng, Beijing (CN)

(73) Assignee: TSINGHUA UNIVERSITY, Beijing (CN)

( * ) Notice: Subject to any disclaimer, the term of this patent is extended or adjusted under 35 U.S.C. 154(b) by 0 days.

(21) Appl. No.: 17/121,672

(22) Filed: Dec. 14, 2020

(65) Prior Publication Data

US 2021/0096067 A1    Apr. 1, 2021

Related U.S. Application Data

(63) Continuation-in-part of application No. PCT/CN2018/115289, filed on Nov. 14, 2018.

(30) Foreign Application Priority Data

Jun. 12, 2018    (CN) .......................... 201810601268.9

(51) Int. Cl.
    *G01N 21/3586*    (2014.01)
    *G01J 3/28*    (2006.01)

(52) U.S. Cl.
    CPC ........ *G01N 21/3586* (2013.01); *G01J 3/2823* (2013.01); *G01J 2003/2826* (2013.01)

(58) Field of Classification Search
CPC ................... G01N 2021/3595; G01N 21/3586
See application file for complete search history.

(56) References Cited

FOREIGN PATENT DOCUMENTS

| CN | 102012216 | 4/2011 |
|---|---|---|
| CN | 102599910 | 7/2012 |
| CN | 102973271 | 3/2013 |
| CN | 103932710 | 7/2014 |
| CN | 104699986 A * | 6/2015 |

(Continued)

OTHER PUBLICATIONS

A Ruth M Woodward, "Terahertz pulse imaging in reflection geometry of human skin cancer and skin tissue" 2002 (Year: 2002).*

(Continued)

*Primary Examiner* — Maurice C Smith

(57) ABSTRACT

The present application provides a terahertz spectral imaging data reconstruction method, an apparatus, a device, and a storage medium. The method includes: scanning a target object according to the first spatial interval and the first time domain sampling period to acquire the first terahertz spectral data; scanning the target object according to the second spatial interval and the second time domain sampling period to acquire the second terahertz spectral data, the first spatial interval is larger than the second spatial interval, and the first time domain sampling period is larger than the second time domain sampling period; and reconstructing the second terahertz spectral data on basis of the first terahertz spectral data by using the preset reconstruction method to obtain the third terahertz spectral data.

18 Claims, 8 Drawing Sheets

(56) References Cited

FOREIGN PATENT DOCUMENTS

| CN | 104809691 | 7/2015 |
|----|-----------|--------|
| CN | 104990888 | 10/2015 |
| CN | 106441575 | 2/2017 |
| CN | 106769995 | 5/2017 |

OTHER PUBLICATIONS

Zaytsev, "Invariant embedding technique for medium permittivity profile reconstruction using terahertz time domain spectroscopy", Jun. 2013 (Year: 2013).*
Masatomo Yamagiwa, "Real-Time Amplitude and Phase Imaging of Optically Opaque Objects by Combining Full-Field Off-Axis Terahertz Digital Holography with Angular Spectrum Reconstruction", Apr. 3, 2018 (Year: 2018).*
International Search Report of PCT/CN2018/115289.
"Optimization of Terahertz Time Domain System and Control Program Design", Chuanjun Liu, China Master's Theses Full-Text Database Engineering Science and Technology II, No. No. 7, Jul. 15, 2015, pp. 30-40.
"The Method of Image Processing of Terahertz Time-Domain Spectral Imaging", Kun Yang et al., Acta Optica Sinica, No. No. 29, Jun. 30, 2009, pp. 102-106.
"Terahertz Spectrum Analysis Based on Empirical Mode Decomposition", Yunpeng Su et al., J Infrared Milli Terahz Waves, May 17, 2017, pp. 972-979.

\* cited by examiner

TERAHERTZ SPECTRAL IMAGING DATA RECONSTRUCTION METHOD, APPARATUS, DEVICE, AND STORAGE MEDIUM

CROSS-REFERENCE TO RELATED APPLICATIONS

This application claims all benefits accruing under 35 U.S.C. § 119 from China Patent Application No. 2018106012689, filed on Jun. 12, 2018 in the China National Intellectual Property Administration, the content of which is hereby incorporated by reference. This application is a continuation-in-part under 35 U.S.C. § 120 of international patent application PCT/CN2018/115289 filed on Nov. 14, 2018, the content of which is also hereby incorporated by reference.

FIELD

The present application relates to the field of scanning imaging technology, in particular to terahertz spectral imaging data reconstruction methods, apparatuses, devices, and storage mediums.

BACKGROUND

Terahertz (THz) waves are electromagnetic waves having frequencies in the range of 0.1 THz to 10 THz, have advantages such as penetrating, low energy, non-destructiveness, high spectral resolution, and so on, and therefore have unique superiority and applications in the field of imaging. At present, terahertz time domain spectral imaging technology is the earliest and most mature technology in the terahertz imaging technology.

In the terahertz time domain spectral imaging technology, an object to be detected can be spatially and time domain scanned to obtain terahertz time domain spectral imaging data which is subsequently analyzed and processed, to achieve terahertz spectral images and curves based on the processed terahertz time domain spectral imaging data.

However, the terahertz time domain spectral imaging technology has problems such as long scanning time and huge data volume.

SUMMARY

In view of this, the present application discloses a terahertz spectral imaging data reconstruction method, an apparatus, a device, and a storage medium.

A terahertz spectral imaging data reconstruction method includes:
scanning a target object according to a first spatial interval and a first time domain sampling period to acquire first terahertz spectral data;
scanning the target object according to a second spatial interval and a second time domain sampling period to acquire second terahertz spectral data, the first spatial interval is larger than the second spatial interval, and the first time domain sampling period is larger than the second time domain sampling period; and
reconstructing the second terahertz spectral data on basis of the first terahertz spectral data by using a preset reconstruction method to obtain third terahertz spectral data.

A terahertz spectral imaging data reconstruction apparatus includes a first acquisition module, a second acquisition module, and a reconstruction module. The first acquisition module is configured to scan a target object according to a first spatial interval and a first time domain sampling period to acquire first terahertz spectral data. The second acquisition module is configured to scan the target object according to a second spatial interval and a second time domain sampling period to acquire second terahertz spectral data. The first spatial interval is larger than the second spatial interval. The first time domain sampling period is larger than the second time domain sampling period. The reconstruction module is configured to reconstruct the second terahertz spectral data on basis of the first terahertz spectral data by using a preset reconstruction method to obtain third terahertz spectral data.

A computer device includes a processor and a memory. The memory stores a computer program. When the computer program is executed by the processor, the following steps are implemented:
scanning a target object according to a first spatial interval and a first time domain sampling period to acquire first terahertz spectral data;
scanning the target object according to a second spatial interval and a second time domain sampling period to acquire second terahertz spectral data, the first spatial interval is larger than the second spatial interval, and the first time domain sampling period is larger than the second time domain sampling period; and
reconstructing the second terahertz spectral data on basis of the first terahertz spectral data by using a preset reconstruction method to obtain third terahertz spectral data.

A computer readable storage medium stores a computer program. When the computer program is executed by a processor, the following steps are implemented:
scanning a target object according to a first spatial interval and a first time domain sampling period to acquire first terahertz spectral data;
scanning the target object according to a second spatial interval and a second time domain sampling period to acquire second terahertz spectral data, the first spatial interval is larger than the second spatial interval, and the first time domain sampling period is larger than the second time domain sampling period; and
reconstructing the second terahertz spectral data on basis of the first terahertz spectral data by using a preset reconstruction method to obtain third terahertz spectral data.

The details of one or more embodiments of the present application are set forth in the accompanying drawings and the description below. Other features, objects, and advantages of the present application will be apparent from the description and drawings, and from the claims.

BRIEF DESCRIPTION OF THE DRAWINGS

To describe the technical solutions in the embodiments of the present application more clearly, the following briefly describes the accompanying drawings referred in the description of the embodiments. The accompanying drawings in the following description show merely some embodiments of the present application, and a person of ordinary skill in the art may derive other drawings from the provided accompanying drawings without creative efforts.

DETAILED DESCRIPTION

The following clearly describes the technical solutions in the embodiments of the present application with reference to the accompanying drawings in the embodiments of the present application. Apparently, the described embodiments are merely a part rather than all of the embodiments of the present application. All other embodiments obtained by a person of ordinary skill in the art based on the embodiments of the present application without creative efforts shall fall within the protection scope of the present application.

Embodiments of the present application disclose a terahertz spectral imaging data reconstruction method, an apparatus, a device, and a storage medium to effectively shorten the scanning time and reduce the data volume in the terahertz spectral imaging.

Figure 1:
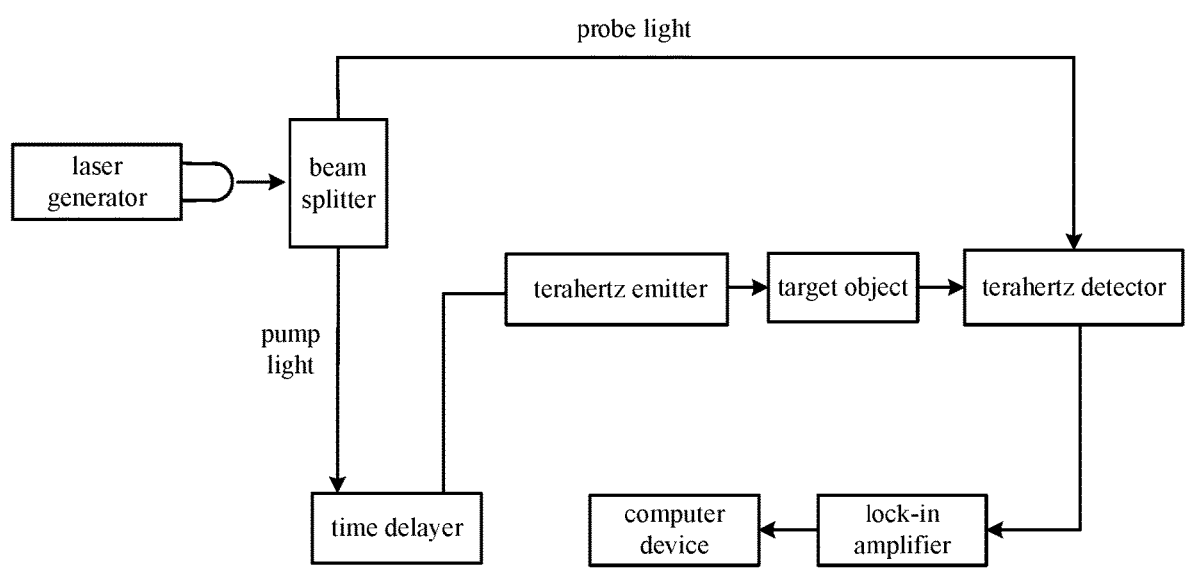
FIG. 1 is a block diagram of a terahertz time domain spectral imaging system according to an embodiment of the present application.

The terahertz spectral imaging data reconstruction method provided in embodiments of the present application is applicable to a terahertz time domain spectral imaging system as shown in FIG. 1. The system includes a laser generator, a beam splitter, a time delayer, a terahertz emitter, a terahertz detector, a lock-in amplifier, and a computer device. The laser generator is configured to generate a laser pulse. The time delayer is configured to receive the pump pulse, and regulate time delay of the pump pulse related to the probe pulse. The terahertz emitter is configured to generate the terahertz pulse according to a pump pulse passed through the time delayer. The terahertz detector is configured to receive the terahertz pulse and generate a terahertz pulse time domain waveform according to the terahertz pulse. The lock-in amplifier is configured to amplify the signal output from the terahertz detector and output the amplified signal to the computer device to process. The target object can be placed onto a movable platform (not shown). The computer device can be respectively connected to the time delayer and the movable platform.

The operation principle of the system is as follows. A laser pulse is generated by the laser generator and split into two light beams, a pump light beam and a probe light beam, by the beam splitter. The pump light beam passes through the time delayer and reaches the terahertz emitter to cause the generation of a terahertz pulse. The terahertz pulse reaches the target object, travels through the target object, and then reaches the terahertz detector. The probe light beam and the terahertz pulse reach the terahertz detector, in which the terahertz pulse time domain waveform is formed. The terahertz pulse time domain waveform is amplified by the lock-in amplifier and then transmitted to the computer device to process and image.

In related art, in the terahertz time domain spectral imaging system, in order to increase the resolution of a spectral images and curves, it is required to acquire massive spatial scanning data of the target object and acquire massive time domain scanning data at each spatial scanning point. Consequently, the scanning time is long and the data volume is huge. Embodiments of the present application provide a terahertz spectral imaging data reconstruction method to solve the problems of long scanning time and huge data volume in the related art, so as to increase the processing efficiency of the computer device, improve the performance of the computer device, and increase the sampling efficiency of the terahertz spectral imaging via the computer device.

The technical solutions of the present application will be described in detail below with specific embodiments. The following specific embodiments may be combined with each other, and the same or similar concepts or processes may be not repeated in some embodiments.

Figure 2:
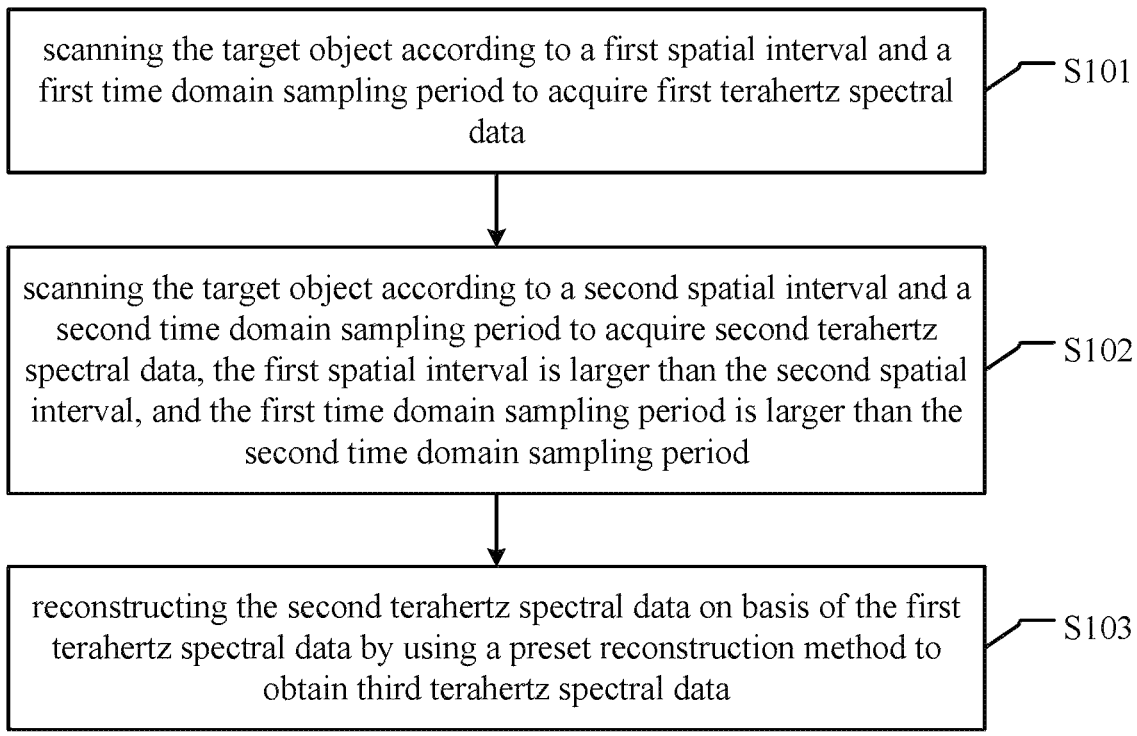
FIG. 2 is a flow chart of a terahertz spectral imaging data reconstruction method according to an embodiment of the present application.

FIG. 2 is a flow chart of an embodiment of the terahertz spectral imaging data reconstruction method. This embodiment relates to a process in which a target object is subjected to two scans, and data acquired in the two scans are used to reconstruct complete high resolution terahertz spectral data. The method can be executed by the computer device shown in the FIG. 1. As shown in FIG. 2, the method includes steps of:

S101, scanning the target object according to a first spatial interval and a first time domain sampling period to acquire first terahertz spectral data;

S102, scanning the target object according to a second spatial interval and a second time domain sampling period to acquire second terahertz spectral data, the first spatial interval is larger than the second spatial interval, and the first time domain sampling period is larger than the second time domain sampling period; and S103, reconstructing the second terahertz spectral data on basis of the first terahertz spectral data by using a preset reconstruction method to obtain third terahertz spectral data.

The target object refers to an object to be measured or imaged. The target object can be disposed on the movable platform. The computer device can control the movable platform to move, causing the target object to move with the movable platform. The first terahertz spectral data can be a spectral image data cube. Each data element in the spectral image data cube can be a spectral curve having a complete terahertz pulse time domain waveform. A specific data format can be determined according to the actual detecting or imaging requirements, as well as the type of information to be extracted. The first terahertz spectral data can be time domain data or frequency domain data. The first terahertz spectral data can contain geometric information of the target object, and/or intensity, amplitude, phase information, and the like of the responsive terahertz pulse of the target object.

In this embodiment, the scan performed on the target object according to the first spatial interval and the first time domain sampling period is referred to as a first scan. The first spatial interval is used to represent a sampling distance interval adopted in the first scan performed on the target object. The first time domain sampling period is used to represent a sampling time period adopted in the first scan performed on the target object. The spectral resolution of the third terahertz spectral data is depended on the first time domain sampling period. The reconstruction accuracy for the third terahertz spectral data is related to the first spatial interval. The smaller the first spatial interval, the higher the reconstruction accuracy. The computer device can control the movement of the movable platform according to the first spatial interval to move the target object, so that different pixel points can be scanned. The computer device can control the time delayer according to the first time domain sampling period, thereby determining the sampling time period at each pixel point of the target object, so as to acquire the terahertz pulse time domain waveforms at different pixel points of the target object, and thus obtain the first terahertz spectral data.

The target object in the S102 and the target object in the S101 is the same object. The second terahertz spectral data refers to data acquired by the computer device when the target object is scanned again according to the second spatial interval and the second time domain sampling period after the S101. The second terahertz spectral data can be a spectral image data cube constructed by the data. A specific data format can be determined according to the actual detecting or imaging requirements, as well as the type of information to be extracted. A data type of the second terahertz spectral data is consistent with that of the first terahertz spectral data obtained in the S101. The second terahertz spectral data can contain geometric information of the target object, and/or intensity, amplitude, phase information, and the like of the responsive terahertz pulse of the target object.

In this embodiment, the scan performed on the target object according to the second spatial interval and the second time domain sampling period is referred to as a second scan. The second time domain sampling period is used to represent a sampling time period adopted in the second scan performed on the target object. The reconstruction accuracy for the third terahertz spectral data is further related to the second time domain sampling period. The larger the second sampling period, the higher the reconstruction accuracy. The second spatial interval is used to represent a sampling distance interval adopted in the second scan performed on the target object. The final reconstructed spatial interval of third terahertz spectral data is same as the second spatial interval. A person of ordinary skill in the art can determine that according to actual needs. The process of scanning the target object according to the second spatial interval and the second time domain sampling period is similar to the process of scanning the target object according to the first spatial interval and the first time domain sampling period, and will not be repeated herein.

Since the first spatial interval is larger than the second spatial interval, a spatial sampling point number in the first can is smaller than that in the second scan. For example, when the first spatial interval is 2 cm, and the second spatial interval is 2 mm, the spatial sampling point number in the first can be 10, and the spatial sampling point number in the second is 100. Since the first time domain sampling period is larger than the second time domain sampling period, a time domain sampling number in the first scan is larger than that in the second scan. For example, when the first time domain sampling period is 100 ps, and the second time domain sampling period is 10 ps, the time domain sampling number in the first scan can be 1000, and the time domain sampling number in the second scan is 100. Therefore, in this embodiment, the first terahertz spectral data acquired in the first scan is the spectral image data cube having a high spectral resolution and a low spatial resolution, while the second terahertz spectral data acquired in the second scan is the spectral image data cube having a high spatial resolution and a low spectral resolution.

The preset reconstruction method can adopt a conventional data reconstructing algorithm, such as wiener estimation, pseudo-inverse, neural network, or deep learning algorithm, which is not limited in this embodiment. The third terahertz spectral data is data obtained by reconstructing the second terahertz spectral data on basis of the first terahertz spectral data. The data type of the third terahertz spectral data is consistent with that of the second terahertz spectral data. The third terahertz spectral data can be used in the spectral imaging of the target object.

In the conventional spectral imaging, in order to increase the resolution of the spectral image data cube, it is required to acquire scanning data at a large number of spatial scanning points of the target object and massive time domain scanning points at each spatial scanning point. Consequently, the scanning time is long and the data volume is huge. In this embodiment of the present application, the first scan is performed on the target object according to the first spatial interval and the first time domain sampling period to acquire the first terahertz spectral data; the second scan is performed on the target object according to the second spatial interval and the second time domain sampling period to acquire the second terahertz spectral data; and the second terahertz spectral data is reconstructed on basis of the first terahertz spectral data by using the preset reconstruction method to obtain the third terahertz spectral data. In this embodiment, the first time domain sampling period can be the same as a time domain sampling period adopted in the conventional spectral imaging, and the second spatial interval can be the same as a spatial interval adopted in the conventional spectral imaging. Thus the resolution of third terahertz spectral data is the same as the conventional spectral imaging. Since the first spatial interval is larger than the second spatial interval, the number of spatial scanning points (i.e., the spatial sampling point number) in the first scan is smaller than that in the conventional spectral imaging process. Since the second time domain sampling period is smaller than the first time domain sampling period, the number of time domain scanning points at each spatial scanning point in the second scan is smaller than that in the conventional spectral imaging process. The number of the spatial scanning points and the number of the time domain scanning points were respectively reduced in the two scans. The scanning time and the data volume can be effectively reduced as the number of the spatial scanning points and the number of the time domain scanning points are significantly reduced.

In an embodiment, on basis of the embodiment shown in FIG. 2, the first spatial interval includes a first horizontal interval and a first vertical interval in predetermined coordinate directions perpendicular to each other. The second spatial interval includes a second horizontal interval and a second vertical interval in the predetermined coordinate directions perpendicular to each other. The first spatial interval being larger than the second spatial interval includes any one of the following: the first horizontal interval is equal to the second horizontal interval, and the first vertical interval is larger than the second vertical interval; the first horizontal interval is larger than the second horizontal interval, and the first vertical interval is equal to the second vertical interval; or the first horizontal interval is larger than the second horizontal interval, and the first vertical interval is larger than the second vertical interval.

In the first scan, the computer device can control the movable platform to move according to the first horizontal interval and the first vertical interval, so that different pixel points of the target object on the movable platform can be scanned. Similarly, in the second scan, the computer device can control the movable platform to move according to the second horizontal interval and the second vertical interval, so that different pixel points of the target object on the movable platform can be scanned.

In an embodiment, the first horizontal interval is X times the second horizontal interval. The first vertical interval is Y times the second vertical interval. The second time domain sampling period is 1/Z times the first time domain sampling period. X, Y and Z are both larger than 1, and $$\frac{1}{XY} + \frac{1}{Z} < 1. \ \frac{1}{XY} + \frac{1}{Z}$$

represents a ratio of the total sampling point number of the two scans in the present application to a total sampling point number of a single scan in the conventional spectral imaging.

In an embodiment, X and Y are generally in a range of 3 to 15. A range of Z is related to a peak value of the above-mentioned spectral curve having the terahertz pulse time domain waveform, and a person of ordinary skill in the art can determine the value of Z based on the actual terahertz time domain spectral waveform.

The first spatial interval can be represented by (a, b), wherein a represents the first horizontal interval, and b represents the first vertical interval. The second spatial interval can be represented by (c, d), wherein c represents the second horizontal interval, and d represents the second vertical interval.

In an embodiment, the first horizontal interval is equal to the second horizontal interval, and the first vertical interval is larger than the second vertical interval. Taken a=c=1, b=2, and d=1 as an example. In the first scan, for the horizontal movement of the movable platform, the computer device controls the movable platform to move one distance unit in each move in the horizontal direction; and for the vertical movement of the movable platform, the computer device controls the movable platform to move two distance units in each move in the vertical direction. In the second scan, for the horizontal movement of the movable platform, the computer device controls the movable platform to move one distance unit in each move in the horizontal direction; and for the vertical movement of the movable platform, the computer device controls the movable platform to move one distance unit in each move in the vertical direction. Therefore, the number of the spatial scanning points in the first scan is a half of that in the second scan.

In another embodiment, the first horizontal interval is larger than the second horizontal interval, and the first vertical interval is equal to the second vertical interval. Taken a=2, c=1, and b=d=1 as an example. In the first scan, for the horizontal movement of the movable platform, the computer device controls the movable platform to move two distance units in each move in the horizontal direction; and for the vertical movement of the movable platform, the computer device controls the movable platform to move one distance unit in each move in the vertical direction. In the second scan, for the horizontal movement of the movable platform, the computer device controls the movable platform to move one distance unit in each move in the horizontal direction; and for the vertical movement of the movable platform, the computer device controls the movable platform to move one distance unit in each move in the vertical direction. Therefore, the number of the spatial scanning points in the first scan is a half of that in the second scan.

In another embodiment, the first horizontal interval is larger than the second horizontal interval, and the first vertical interval is larger than the second vertical interval. Taken a=2, c=1, b=2, and d=1 as an example. In the first scan, for the horizontal movement of the movable platform, the computer device controls the movable platform to move two distance units in each move in the horizontal direction; and for the vertical movement of the movable platform, the computer device controls the movable platform to move two distance units in each move in the vertical direction. In the second scan, for the horizontal movement of the movable platform, the computer device controls the movable platform to move one distance unit in each move in the horizontal direction; and for the vertical movement of the movable platform, the computer device controls the movable platform to move one distance unit in each move in the vertical direction. Therefore, the number of the spatial scanning points in the first scan is a quarter of that in the second scan.

The first spatial interval and the second spatial interval can also be represented in other forms such as three-dimensional coordinates, which are not limited herein.

As shown in FIG. 2, two scans are performed on the target object in the embodiments of the present application. In the first scan, the target object is scanned according to the first spatial interval and the first time domain sampling period. In the second scan, the target object is scanned according to the second spatial interval and the second time domain sampling period. The detailed processes of the first scan and the second scan will be described respectively with reference to FIG. 3 and FIG. 4.

Figure 3:
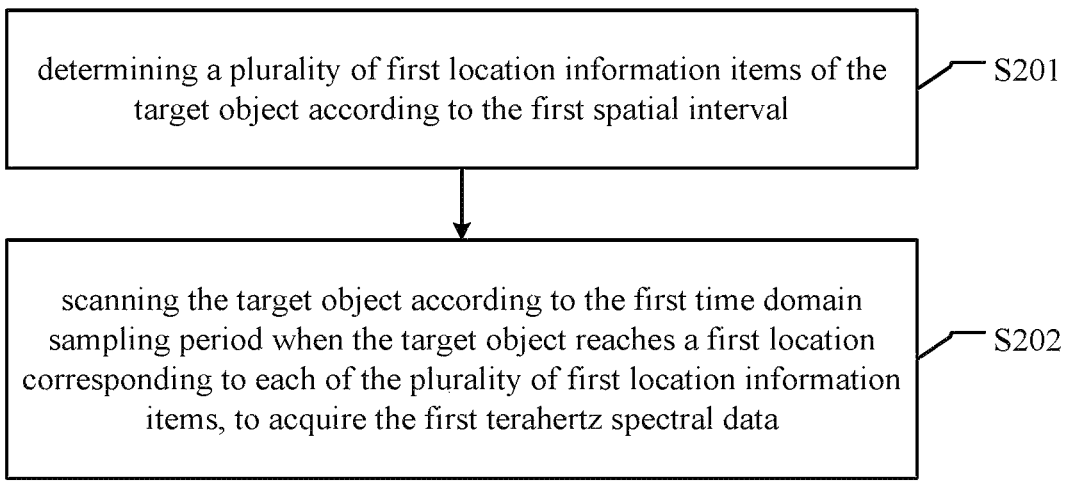
FIG. 3 is a flow chart of an implementation of S101 shown in FIG. 2 according to an embodiment of the present application.

FIG. 3 is a flow chart of an implementation of the S101 as shown in FIG. 2. This embodiment relates to the specific process of the first scan. As shown in FIG. 3, the S101 of scanning the target object according to the first spatial interval and the first time domain sampling period to acquire the first terahertz spectral data can include:

S201, determining a plurality of first location information items of the target object according to the first spatial interval; and S202, scanning the target object according to the first time domain sampling period when the target object reaches a first location corresponding to each of the plurality of first location information items, to acquire the first terahertz spectral data.

Figure 3A:
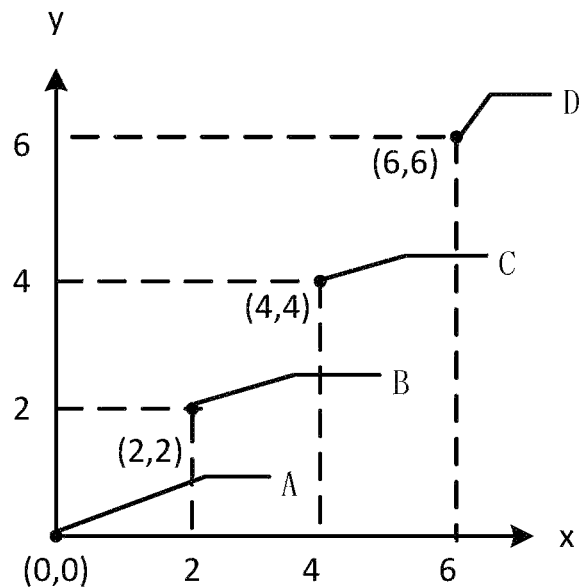
FIG. 3A shows a two-dimensional coordinate system in which a target object is moved during a first scan according to an embodiment of the present application.

In the S201, the first spatial interval can be determined according to parameters such as the desired measurement accuracy, the desired imaging resolution, and the actual dimensions of the target object, and the like. The first location information item can be represented by two-dimensional coordinates or a displacement of the target object. For example, the each of the first location information items can include horizontal location information and vertical location information, or include the displacement with respect to an initial location of the target object. FIG. 3A shows the two-dimensional coordinate system in which the target object is moved in the first scan, wherein x represents the horizontal direction, and y represents the vertical direction. As shown in FIG. 3A, the first horizontal interval of the first spatial interval is two distance units, and the first vertical interval of the first spatial interval is two distance units. A (0,0) represents an initial location of the target object. B (2,2), C (4,4), and D (6,6) respectively represent the first locations of the target object which moves with respect to the initial location according to the first spatial interval.

In the S202, the first time domain sampling period can be determined according to a period of a complete terahertz pulse time domain waveform. The complete terahertz pulse time domain waveform can be acquired by the computer device in the first scan. A specific value of the first time domain sampling period is not limited in this embodiment. The period of final reconstructed third terahertz spectral data is related to the first time domain sampling period. At all first locations, such as A (0,0), B (2,2), C (4,4), and D (6,6) shown in FIG. 3A (not all of the first locations are shown), the target object is scanned according to the first time domain sampling period, so that the first terahertz spectral data is obtained. The scanning sequence can still be done in rows and columns like conventional scanning sequence, but with larger spatial intervals. That is, the first locations can be arranged in rows and columns. For example, the target object can be sequentially moved to first locations (0,0), (2,0), (4,0), . . . , ((2n−2),0); (0,2), (2,2), (4,2), . . . , ((2n−2),2); . . . ; (0, (2m−2)), (2, (2m−2)), (4, (2m−2)), . . . , ((2n−2), (2m−2)) in the first scan, wherein 2n represents the number of rows and 2m represents the number of columns of the convention method. It should be understood that the scanning sequence is not limited thereto and can be varied according to actual needs.

In this embodiment, since the first spatial interval is larger than the second spatial interval, the number of the spatial scanning points is reduced, thereby reducing the data volume.

Figure 4:
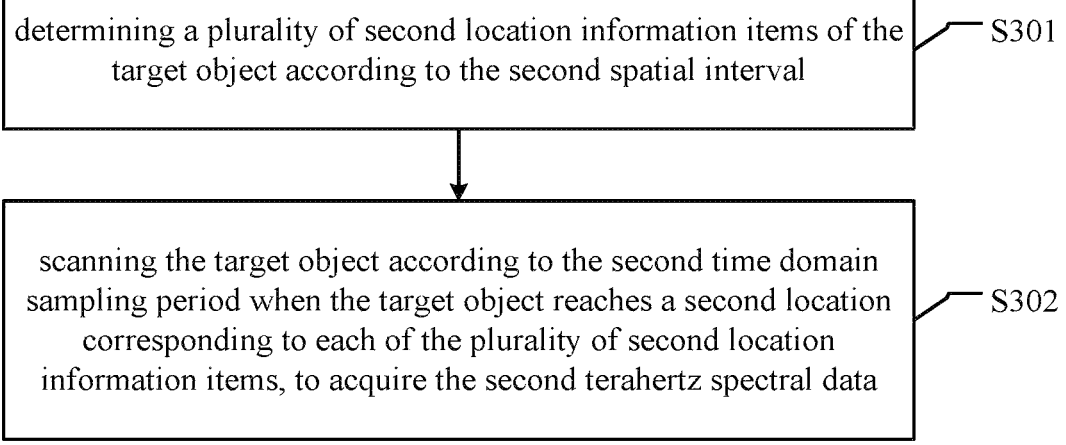
FIG. 4 is a flow chart of an implementation of S102 shown in FIG. 2 according to an embodiment of the present application.

FIG. 4 is a flow chart of an implementation of the S102 as shown in FIG. 2. This embodiment relates to the specific process of the second scan. As shown in FIG. 4, the S102 of scanning the target object according to the second spatial interval and the second time domain sampling period to acquire the second terahertz spectral data can include:

S301, determining a plurality of second location information items of the target object according to the second spatial interval; and S302, scanning the target object according to the second time domain sampling period when the target object reaches a second location corresponding to each of the plurality of second location information items, to acquire the second terahertz spectral data.

Figure 4A:
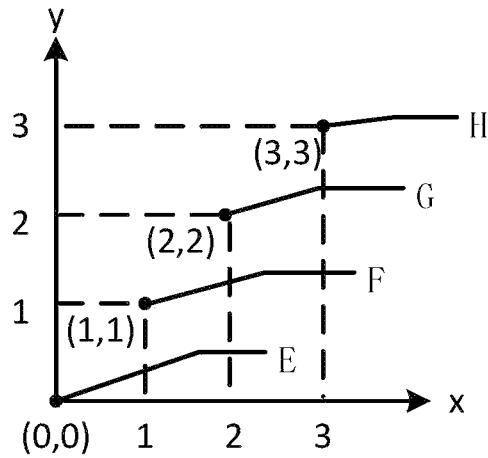
FIG. 4A shows a two-dimensional coordinate system in which the target object is moved during a second scan according to an embodiment of the present application.

In the S301, the second spatial interval can be determined according to parameters such as the desired measurement accuracy, the desired imaging resolution, and the actual dimensions of the target object, and the like. The second spatial interval is smaller than the first spatial interval. The final reconstructed spatial interval of third terahertz spectral data is same as the second spatial interval. The first location information items and the second location information items are represented in the same form. For example, the second location information item can be represented by two-dimensional coordinates. FIG. 4A shows the two-dimensional coordinate system in which the target object is moved in the second scan, wherein x represents the horizontal direction, and y represents the vertical direction. As shown in FIG. 4A, the second horizontal interval and the second vertical interval of the second spatial interval both are one distance unit. E (0,0) represents an initial location of the target object. F (1,1), G (2,2), and H (3,3) respectively represent the second locations of the target object which moves with respect to the initial location E (0, 0) according to the second spatial interval. The scanning sequence can still be done in rows and columns like conventional scanning sequence. That is, the second locations can be arranged in rows and columns. For example, the target object can be sequentially moved to second locations (0,0), (1,0), (2,0), . . . , ((2n−1),0); (0,1), (1,1), (2,1), . . . , ((2n−1),1); . . . ; (0, (2m−1)), (1, (2m−1)), (2, (2m−1)), . . . , ((2n−1), (2m−1)) in the second scan, wherein 2n represents the number of rows and 2m represents the number of columns of the convention method. It should be understood that the scanning sequence is not limited thereto and can be varied according to actual needs.

As compared to FIG. 3A, it can be seen that the second spatial interval is smaller than the first spatial interval, and more specifically, the second horizontal interval of the second spatial interval is a half of the first horizontal interval of the first spatial interval, and the second vertical interval of the second spatial interval is a half of the first vertical interval of the first spatial interval. Therefore, the spatial scanning point number in the second scan is larger than that in the first scan, and a spatial resolution of the second terahertz spectral data is higher than that of the first terahertz spectral data.

In the 302, the terahertz pulse time domain waveform can be acquired by the computer device in the second scan for the target object. Since the second time domain sampling period is smaller than the first time domain sampling period, the time domain sampling number at each pixel point in the second scan is smaller than that in the first scan, and the spectral resolution of the second terahertz spectral data is lower than that of the first terahertz spectral data.

In this embodiment, since the first spatial interval is larger than the second spatial interval, the number of the spatial scanning points is reduced, thereby reducing the data volume.

FIGS. 3 and 4 respectively relate to the specific implementation of the first scan and the second scan. The first terahertz spectral data and the second terahertz spectral data are respectively acquired in the first scan and the second scan. A specific implementation of reconstructing the second terahertz spectral data on basis of the first terahertz spectral data to obtain the third terahertz spectral data will be described in detail with reference to FIG. 5 hereafter.

Figure 5:
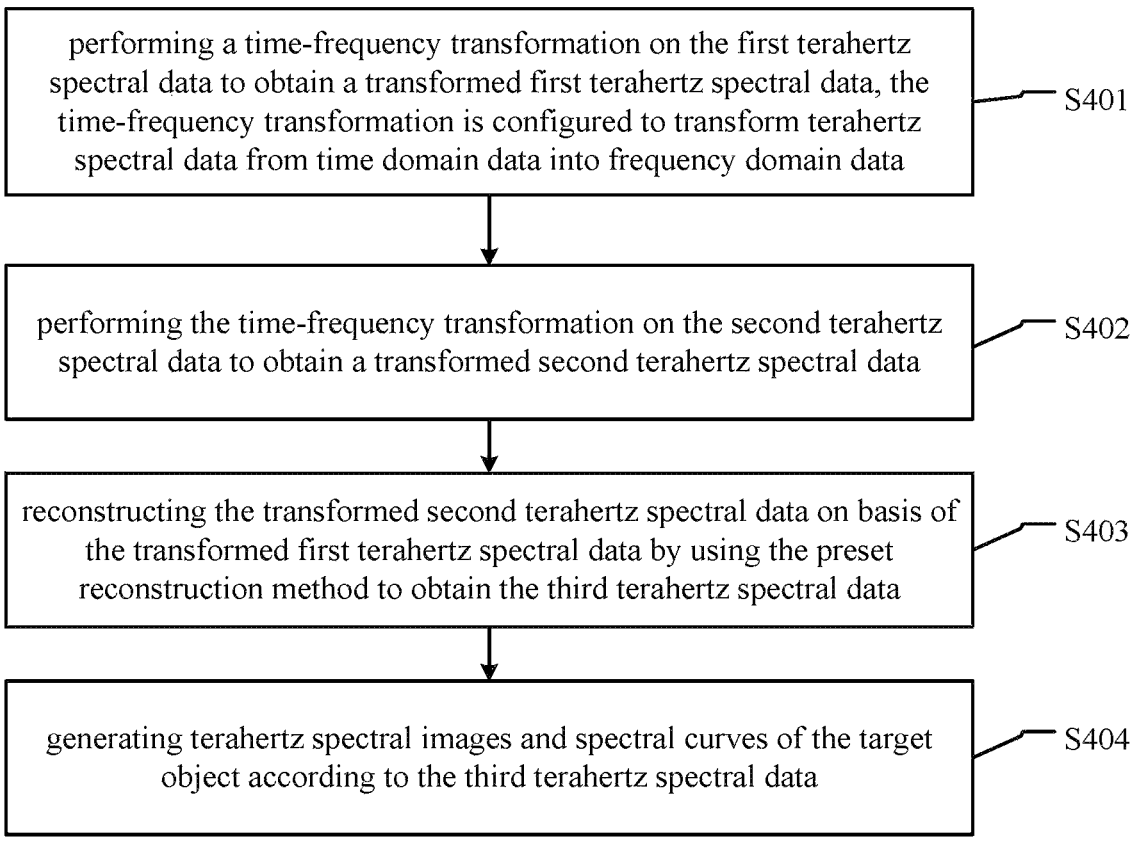
FIG. 5 is a flow chart of an implementation of S103 shown in FIG. 2 according to an embodiment of the present application.

FIG. 5 is a flow chart of an implementation of S103 shown in FIG. 2. This embodiment relates to a process for obtaining the third terahertz spectral data. As shown in FIG. 5, the S103 of reconstructing the second terahertz spectral data on basis of the first terahertz spectral data by using the preset reconstruction method to obtain the third terahertz spectral data includes:

S401, performing a time-frequency transformation on the first terahertz spectral data to obtain a transformed first terahertz spectral data, the time-frequency transformation is configured to transform terahertz spectral data from time domain data into frequency domain data;

S402, performing the time-frequency transformation on the second terahertz spectral data to obtain a transformed second terahertz spectral data; and S403, reconstructing the transformed second terahertz spectral data on basis of the transformed first terahertz spectral data by using the preset reconstruction method to obtain the third terahertz spectral data.

The time-frequency transformation can be achieved by a conventional transformation method such as Fourier transformation method, fast Fourier transformation method, and the like, which is not limited herein. The computer device can transform the first terahertz spectral data from time domain data into frequency domain data by using a preset time-frequency transformation method.

The transformation method adopted by the time-frequency transformation for the second terahertz spectral data can be the same as that for the first terahertz spectral data. The computer device can transform the second terahertz spectral data from time domain data into frequency domain data by using the preset time-frequency transformation method.

The preset reconstruction method can adopt a conventional data reconstructing algorithm, such as wiener estimation, pseudo-inverse, neural network, or deep learning algorithm, which is not limited in this embodiment. For example, the transformed second terahertz spectral data can be reconstructed in frequency domain on basis of the transformed first terahertz spectral data by using the pseudo-inverse algorithm to obtain the third terahertz spectral data.

The third terahertz spectral data obtained in this embodiment is frequency domain spectral data. In practice application, the spectral imaging can be performed by using amplitudes, absorptivities, refractive indexes, and/or powers at different frequency in the third terahertz spectral data as imaging parameters. The target object can also be analyzed and measured by using amplitudes, absorptivities, refractive indexes, and/or powers at different spatial points in the third terahertz spectral data as measuring parameters.

As described above, the first terahertz spectral data acquired in the first scan is a spectral image data cube having a high spectral resolution and a low spatial resolution, while the second terahertz spectral data acquired in the second scan is a spectral image data cube having a high spatial resolution and a low spectral resolution.

In an embodiment, the S103 can include:
reconstructing the second terahertz spectral data by increasing the spectral-resolution of the second terahertz spectral data on basis of the spectral curves acquired at all pixel points scanned in the first scan (i.e., the spectral curves in the first terahertz spectral data).

In an embodiment, the S103 can specifically include:
transforming the second terahertz spectral data into a matrix S and transforming the spectral curves acquired at all pixel points scanned in the first scan into a matrix F;

extracting a transition matrix T from the matrix F, the transition matrix T having the same spectral curve number as that of the matrix F and the same spectral resolution as that of the matrix S;

constructing a complete data matrix R according to an equation R=F×pinv(T)×S by a pseudo-inverse method, the complete data matrix R having the same spectral curve number as that of the matrix S and the same spectral resolution as that of the matrix F; and transforming the complete data matrix R into the third terahertz spectral data.

The third terahertz spectral data has the same spatial resolution as that of the second terahertz spectral data and the same spectral resolution as that of the first terahertz spectral data. Therefore, the third terahertz spectral data is a spectral image data cube having a high spectral resolution and a high spatial resolution.

It should be understood that although the specific implementation of the S103 is illustrated herein with the pseudo-inverse method, a person of ordinary skill in the art can implement the S103 via other methods such as the wiener estimation and the deep learning which is not limited in this embodiment.

Optionally, after the S403, the method can further include:
S404, generating terahertz spectral images and spectral curves of the target object according to the third terahertz spectral data.

In this embodiment, when the third terahertz spectral data obtained by using the preset reconstruction method executed by the computer device is time domain data, amplitude information and phase information of the terahertz pulse time domain waveform can be extracted from the third terahertz spectral data by the computer device, and the terahertz spectral images and curves of the target object can be generated according to the extracted amplitude information and phase information. The terahertz spectral curves of the target object can be generated according to the information of amplitudes, absorptivities, refractive indexes, powers, and the like at different spatial points, and the terahertz spectral images of the target object can be generated according to the extracted information of amplitudes, absorptivities, refractive indexes, powers, and the like at different frequency.

In the terahertz spectral imaging data construction method provided in this embodiment, the computer device reconstructs the second terahertz spectral data on basis of the first terahertz spectral data by using the preset reconstruction method to obtain the third terahertz spectral data, and finally generates the terahertz spectral images and spectral curves according to the third terahertz spectral data. The spatial resolution of third terahertz spectral data is same as the second terahertz spectral data. The spectral resolution is same as the first terahertz spectral data. Thus the resolution of third terahertz spectral data is the same as the terahertz spectral data of conventional spectral imaging method but with less sampling time and data.

It should be understood that although the steps in the flow charts of FIGS. 2 to 5 are displayed in succession as indicated by the arrows, these steps may not necessarily be executed in succession as indicated by the arrows. Unless expressly described herein, the execution of these steps may not be confined to a strict order; instead, the steps can be executed in another order. In addition, at least some steps shown in FIGS. 2 to 5 may include multiple sub-steps or multiple stages. These sub-steps or stages may not necessarily be executed or completed at the same moment, but can be executed at different times, and the order of execution thereof may also not necessarily be in succession, but can be executed in turn or alternately with at least some other steps or sub-steps or stages of other steps.

Figure 6:
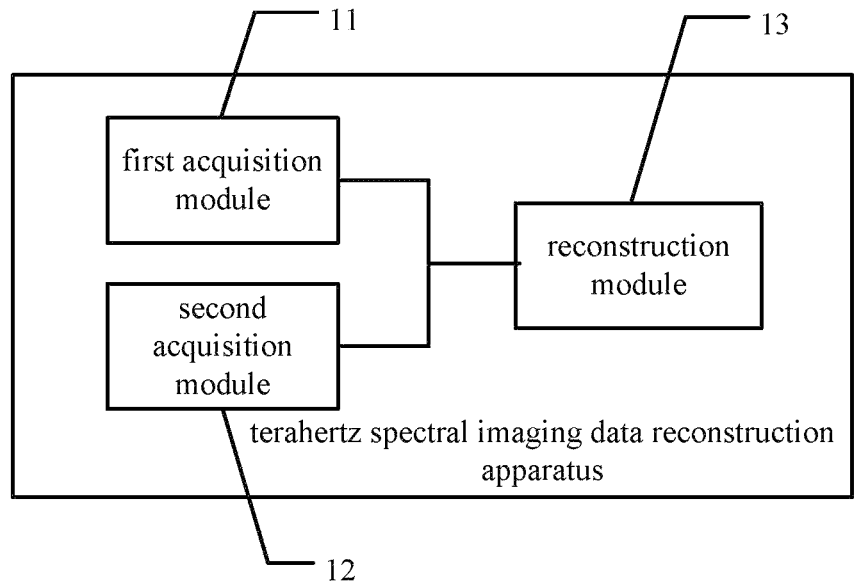
FIG. 6 is a schematic structural view of a terahertz spectral imaging data reconstruction apparatus according to an embodiment of the present application.

FIG. 6 is a schematic structural view of a terahertz spectral imaging data reconstruction apparatus in an embodiment of the present application. The apparatus includes a first acquisition module 11, a second acquisition module 12, and a reconstruction module 13.

The first acquisition module 11 is configured to scan the target object according to the first spatial interval and the first time domain sampling period to acquire the first terahertz spectral data.

The second acquisition module 12 is configured to scan the target object according to the second spatial interval and the second time domain sampling period to acquire the second terahertz spectral data. The first spatial interval is larger than the second spatial interval. The first time domain sampling period is larger than the second time domain sampling period.

The reconstruction module 13 is configured to reconstruct the second terahertz spectral data on basis of the first terahertz spectral data by using the preset reconstruction method to obtain the third terahertz spectral data.

In an embodiment, the first spatial interval includes a first horizontal interval and a first vertical interval in predetermined coordinate directions perpendicular to each other. The second spatial interval includes a second horizontal interval and a second vertical interval in the predetermined coordinate directions perpendicular to each other. The first spatial interval being larger than the second spatial interval includes any one of the following: the first horizontal interval is equal to the second horizontal interval, and the first vertical interval is larger than the second vertical interval; the first horizontal interval is larger than the second horizontal interval, and the first vertical interval is equal to the second vertical interval; or the first horizontal interval is larger than the second horizontal interval, and the first vertical interval is larger than the second vertical interval.

In an embodiment, the first horizontal interval is X times the second horizontal interval. The first vertical interval is Y times the second vertical interval. The second time domain sampling period is 1/Z times the first time domain sampling period. X, Y and Z are both larger than 1, and $$\frac{1}{XY} + \frac{1}{Z} < 1. \ \frac{1}{XY} + \frac{1}{Z}$$

represents a ratio of the total sampling point number of the two scans in the present application to a total sampling point number of a single scan in the conventional spectral imaging.

Figure 7:
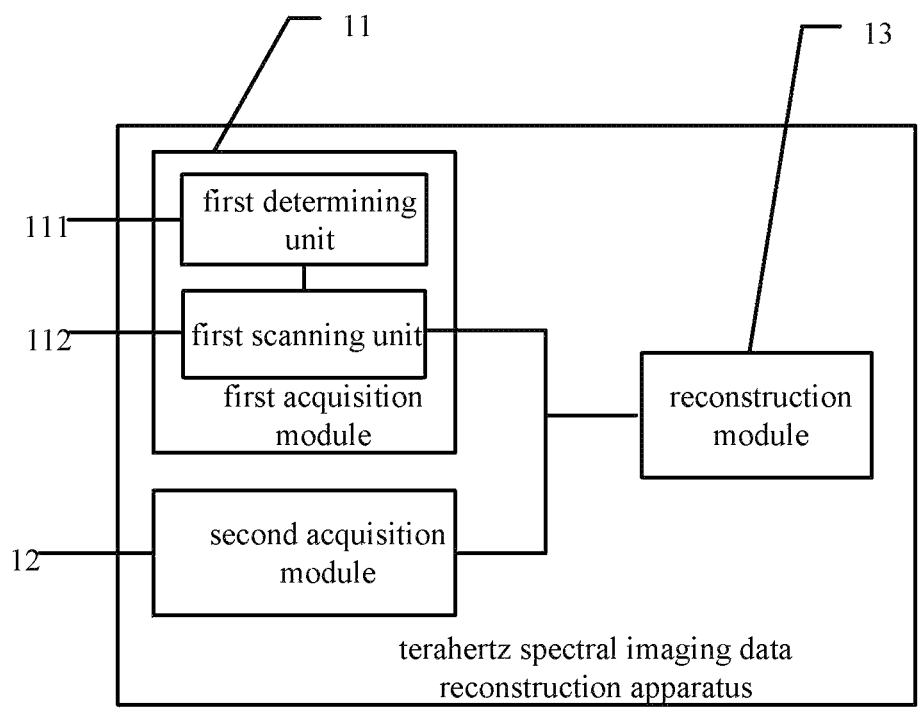
FIG. 7 is a schematic structural view of the terahertz spectral imaging data reconstruction apparatus according to another embodiment of the present application.

Referring to FIG. 7, in an embodiment, on basis of the terahertz spectral imaging data reconstruction apparatus shown in FIG. 6, the first acquisition module 11 includes a first determining unit 111 and a first scanning unit 112.

The first determining unit 111 is configured to determine a plurality of first location information items of the target object according to the first spatial interval.

The first scanning unit 112 is configured to scan the target object according to the first time domain sampling period when the target object reaches a first location corresponding to each of the plurality of first location information items, to acquire the first terahertz spectral data.

Figure 8:
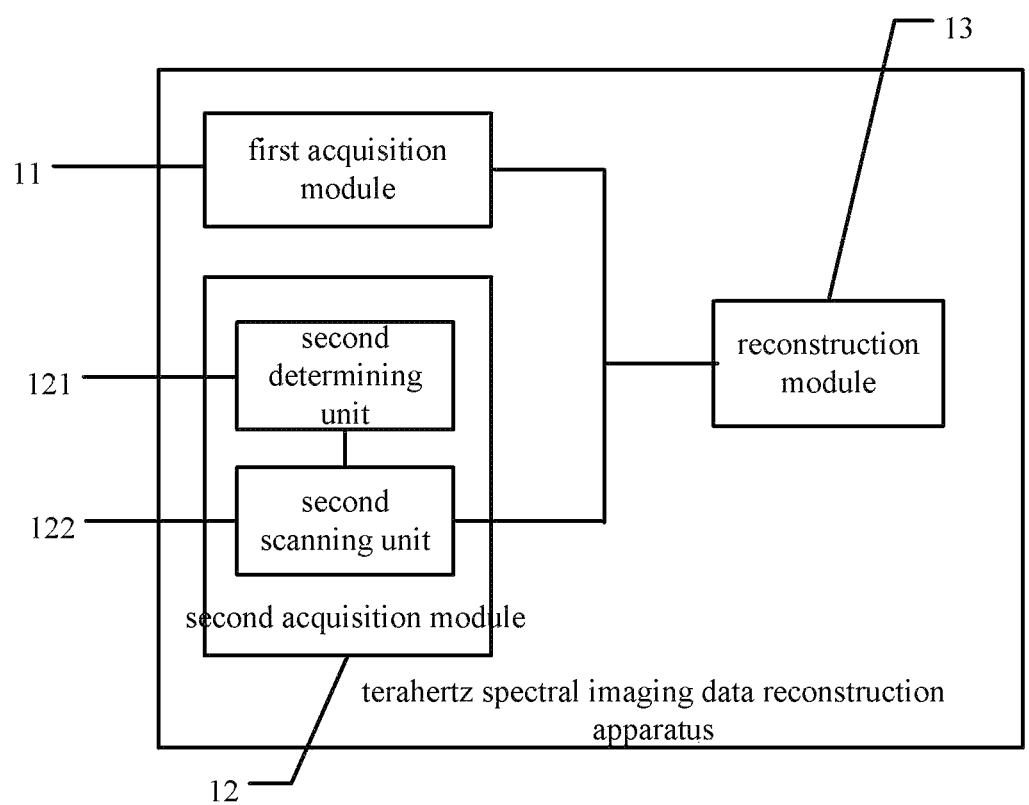
FIG. 8 is a schematic structural view of the terahertz spectral imaging data reconstruction apparatus according to another embodiment of the present application.

Referring to FIG. 8, in an embodiment, on basis of the terahertz spectral imaging data reconstruction apparatus shown in FIG. 6, the second acquisition module 12 includes a second determining unit 121 and a second scanning unit 122.

The second determining unit 121 is configured to determine a plurality of second location information items of the target object according to the second spatial interval.

The second scanning unit 122 is configured to scan the target object according to the second time domain sampling period when the target object reaches a second location corresponding to each of the plurality of second location information items, to acquire the second terahertz spectral data.

Figure 9:
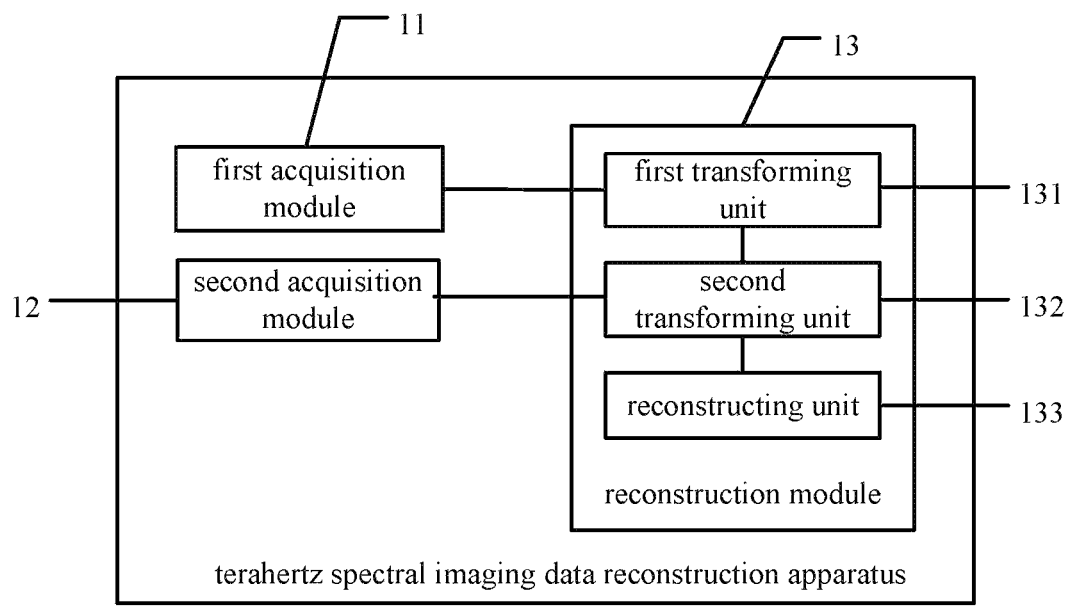
FIG. 9 is a schematic structural view of the terahertz spectral imaging data reconstruction apparatus according to another embodiment of the present application.

Referring to FIG. 9, in an embodiment, on basis of the terahertz spectral imaging data reconstruction apparatus shown in FIG. 6, the reconstruction module 13 can include a first transforming unit 131, a second transforming unit 132, and a reconstructing unit 133.

The first transforming unit 131 is configured to perform the time-frequency transformation on the first terahertz spectral data to obtain transformed first terahertz spectral data. The time-frequency transformation is configured to transform terahertz spectral data from time domain data into frequency domain data.

The second transforming unit 132 is configured to perform the time-frequency transformation on the second terahertz spectral data to obtain a transformed second terahertz spectral data.

The reconstructing unit 133 is configured to reconstruct the transformed second terahertz spectral data on basis of the transformed first terahertz spectral data by using the preset reconstruction method to obtain the third terahertz spectral data.

Figure 10:
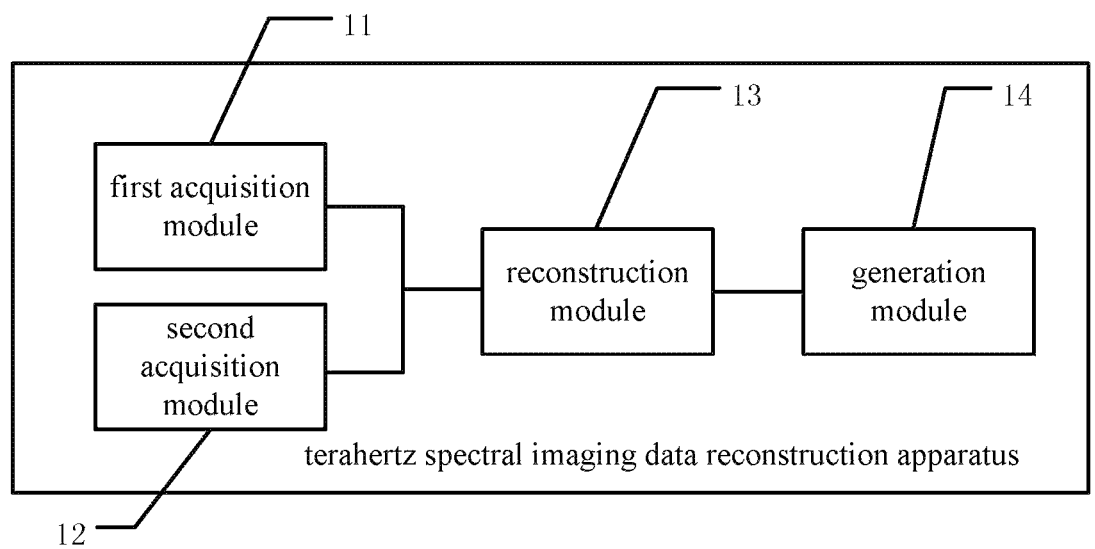
FIG. 10 is a schematic structural view of the terahertz spectral imaging data reconstruction apparatus according to another embodiment of the present application.

Referring to FIG. 10, in an embodiment, on basis of the terahertz spectral imaging data reconstruction apparatus shown in FIG. 6, the apparatus can further include a generation module 14 configured to generate the terahertz spectral images and spectral curves of the target object according to the third terahertz spectral data.

The specific description for the terahertz spectral imaging data reconstruction apparatus can be found in the specific description for the terahertz spectral imaging data reconstruction method and will not be repeated herein. Each of the above-described modules of the terahertz spectral imaging data reconstruction apparatus can be implemented entirely or partially by software, hardware, and combinations thereof. Each of the above-described modules can be in a form of hardware and integrated with or separated from the memory of the computer device, or can be in a form of software and stored in the memory of the computer device, so that the processor can call and execute each step corresponding to each of the above-described modules.

Figure 11:
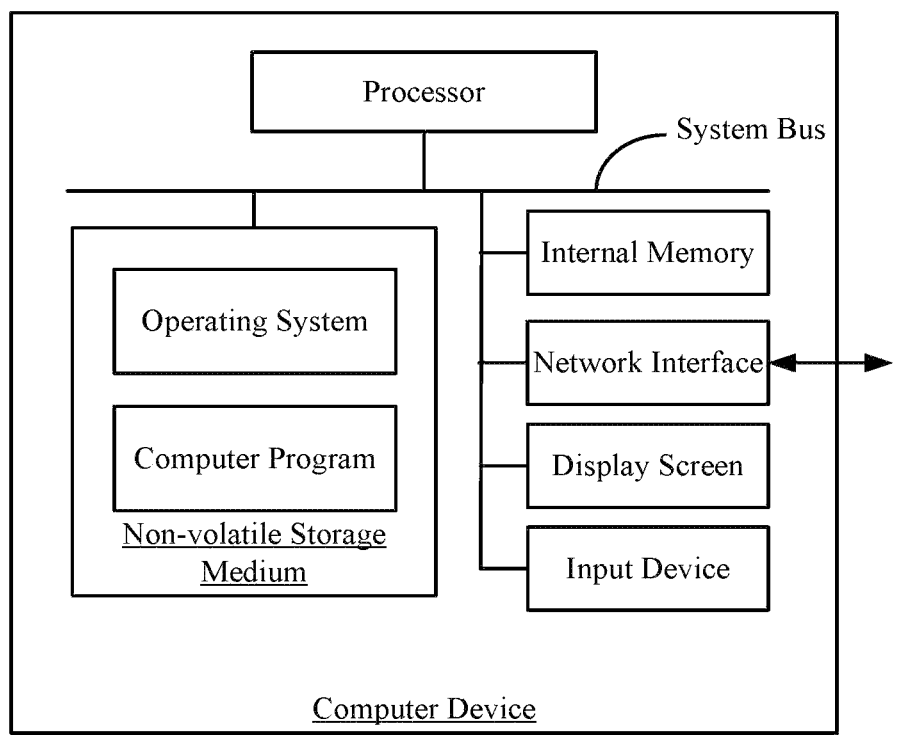
FIG. 11 is a schematic view of an internal structure of a computer device according to an embodiment of the present application.

In an embodiment, a computer device is provided. The computer device can be a server. The computer device can have an internal structure as shown in FIG. 11. The computer device can include a processor, a memory, a network interface, and a database connected by a system bus. The processor of the computer device is used for providing computing and controlling capabilities. The memory of the computer device includes a non-transitory storage medium and an internal memory. The non-transitory storage medium stores an operating system, a computer program, and a database. The internal memory provides an operating environment for the operating system and the computer program stored in the non-transitory storage medium. The database in the computer device is configured to store data such as spectral waveforms. The network interface is used for network communication with an external terminal. The computer program is capable of being executed by the processor to implement a spectral image data processing method.

It could be understood by a person of ordinary skill in the art that the structure illustrated in FIG. 11 is merely a block diagram of a part of the structure related to the solution of the present application and does not constitute a limitation on the computer device of the present application. A specific computer device can include more or fewer components than what is illustrated in the figure, combine certain components, or have different components arrangement.

In an embodiment, a computer device is provided. The computer device includes a processor and a memory. The memory stores a computer program. When the computer program is executed by the processor, the following steps are implemented:

scanning the target object according to the first spatial interval and the first time domain sampling period to acquire the first terahertz spectral data;

scanning the target object according to the second spatial interval and the second time domain sampling period to acquire the second terahertz spectral data; the first spatial interval is larger than the second spatial interval, and the first time domain sampling period is larger than the second time domain sampling period; and reconstructing the second terahertz spectral data on basis of the first terahertz spectral data by using the preset reconstruction method to obtain the third terahertz spectral data.

In an embodiment, when the computer program is executed by the processor, the following is further implemented. The first spatial interval includes a first horizontal interval and a first vertical interval in predetermined coordinate directions perpendicular to each other. The second spatial interval includes a second horizontal interval and a second vertical interval in the predetermined coordinate directions perpendicular to each other. The first spatial interval being larger than the second spatial interval includes any one of the following: the first horizontal interval is equal to the second horizontal interval, and the first vertical interval is larger than the second vertical interval; the first horizontal interval is larger than the second horizontal interval, and the first vertical interval is equal to the second vertical interval; or the first horizontal interval is larger than the second horizontal interval, and the first vertical interval is larger than the second vertical interval.

In an embodiment, when the computer program is executed by the processor, the following is further implemented. The first horizontal interval is X times the second horizontal interval. The first vertical interval is Y times larger than the second vertical interval. The second time domain sampling period is 1/Z times the first time domain sampling period. X, Y and Z are both larger than 1, and $$\frac{1}{XY} + \frac{1}{Z} < 1. \ \frac{1}{XY} + \frac{1}{Z}$$

represents a ratio of the total sampling point number of the two scans in the present application to a total sampling point number of a single scan in the conventional spectral imaging.

In an embodiment, when the computer program is executed by the processor, the following is further implemented. The step of scanning the target object according to the first spatial interval and the first time domain sampling period to acquire the first terahertz spectral data includes: determining a plurality of first location information items of the target object according to the first spatial interval; and scanning the target object according to the first time domain sampling period when the target object reaches a first location corresponding to each of the plurality of first location information items, to acquire the first terahertz spectral data.

In an embodiment, when the computer program is executed by the processor, the following is further implemented. The step of scanning the target object according to the second spatial interval and the second time domain sampling period to acquire the second terahertz spectral data includes: determining a plurality of second location information items of the target object according to the second spatial interval; and scanning the target object according to the second time domain sampling period when the target object reaches a second location corresponding to each of the plurality of second location information items, to acquire the second terahertz spectral data.

In an embodiment, when the computer program is executed by the processor, the following is further implemented. The step of reconstructing the second terahertz spectral data on basis of the first terahertz spectral data by using the preset reconstruction method to obtain the third terahertz spectral data includes: performing a time-frequency transformation on the first terahertz spectral data to obtain a transformed first terahertz spectral data, the time-frequency transformation is configured to transform terahertz spectral data from time domain data into frequency domain data; performing the time-frequency transformation on the second terahertz spectral data to obtain a transformed second terahertz spectral data; and reconstructing the transformed second terahertz spectral data on basis of the transformed first terahertz spectral data by using the preset reconstruction method to obtain the third terahertz spectral data.

In an embodiment, when the computer program is executed by the processor, the following is further implemented: generating the terahertz spectral images and spectral curves of the target object according to the third terahertz spectral data.

In an embodiment, a computer readable storage medium is provided. The storage medium stores a computer program. When the computer program is executed by the processor, the following steps are implanted:

scanning the target object according to the first spatial interval and the first time domain sampling period to acquire the first terahertz spectral data;

scanning the target object according to the second spatial interval and the second time domain sampling period to acquire the second terahertz spectral data; the first spatial interval is larger than the second spatial interval, and the first time domain sampling period is larger than the second time domain sampling period; and reconstructing the second terahertz spectral data on basis of the first terahertz spectral data by using the preset reconstruction method to obtain the third terahertz spectral data.

In an embodiment, when the computer program is executed by the processor, the following is further implemented. The first spatial interval includes a first horizontal interval and a first vertical interval in predetermined coordinate directions perpendicular to each other. The second spatial interval includes a second horizontal interval and a second vertical interval in the predetermined coordinate directions perpendicular to each other. The first spatial interval being larger than the second spatial interval includes any one of the following: the first horizontal interval is equal to the second horizontal interval, and the first vertical interval is larger than the second vertical interval; the first horizontal interval is larger than the second horizontal interval, and the first vertical interval is equal to the second vertical interval; or the first horizontal interval is larger than the second horizontal interval, and the first vertical interval is larger than the second vertical interval.

In an embodiment, when the computer program is executed by the processor, the following is further implemented. The first horizontal interval is X times the second horizontal interval. The first vertical interval is Y times larger than the second vertical interval. The second time domain sampling period is 1/Z times the first time domain sampling period. X, Y and Z are both larger than 1, and $$\frac{1}{XY} + \frac{1}{Z} < 1. \frac{1}{XY} + \frac{1}{Z}$$

represents a ratio of the total sampling point number of the two scans in the present application to a total sampling point number of a single scan in the conventional spectral imaging.

In an embodiment, when the computer program is executed by the processor, the following is further implemented. The step of scanning the target object according to the first spatial interval and the first time domain sampling period to acquire the first terahertz spectral data includes: determining a plurality of first location information items of the target object according to the first spatial interval; and scanning the target object according to the first time domain sampling period when the target object reaches a first location corresponding to each of the plurality of first location information items, to acquire the first terahertz spectral data.

In an embodiment, when the computer program is executed by the processor, the following is further implemented. The step of scanning the target object according to the second spatial interval and the second time domain sampling period to acquire the second terahertz spectral data includes: determining a plurality of second location information items of the target object according to the second spatial interval; and scanning the target object according to the second time domain sampling period when the target object reaches a second location corresponding to each of the plurality of second location information items, to acquire the second terahertz spectral data.

In an embodiment, when the computer program is executed by the processor, the following is further implemented. The step of reconstructing the second terahertz spectral data on basis of the first terahertz spectral data by using the preset reconstruction method to obtain the third terahertz spectral data includes: performing a time-frequency transformation on the first terahertz spectral data to obtain a transformed first terahertz spectral data, the time-frequency transformation is configured to transform terahertz spectral data from time domain data into frequency domain data; performing the time-frequency transformation on the second terahertz spectral data to obtain a transformed second terahertz spectral data; and reconstructing the transformed second terahertz spectral data on basis of the transformed first terahertz spectral data by using the preset reconstruction method to obtain the third terahertz spectral data.

In an embodiment, when the computer program is executed by the processor, the following is further implemented: generating the terahertz spectral images and spectral curves of the target object according to the third terahertz spectral data.

One of ordinary skill in the art can understand that the entire or part of the flow in the methods as stated in the above embodiments can be carried out by instructing related hardware via a computer program. The computer program can be stored in a nonvolatile computer readable storage medium. When the computer program is being executed, the flow of each of the methods as stated in the above embodiments can be implemented. Any reference to the memory, storage, database, or any other medium can include a nonvolatile and/or volatile memory, where the reference can be used in the embodiments provided in the present application. The nonvolatile memory can include a ROM (Read Only Memory), a PROM (Programmable ROM), an EPROM (Electrically PROM), an EEPROM (Electrically Erasable PROM), or a flash memory. The volatile memory can include a RAM (Random Access Memory) or an external cache memory. By way of illustration and rather than limitation, the RAM can be obtained in various forms, such as a SRAM (Static RAM), a DRAM (Dynamic RAM), a SDRAM (Synchronous DRAM), a DDRSDRAM (Double Data Rate SDRAM), an ESDRAM (Enhanced SDRAM), a SLDRAM (Synchlink DRAM), a RDRAM (Rambus Direct RAM), a DRDRAM (Direct Rambus Dynamic RAM), and a RDRAM (Rambus Dynamic RAM).

It should be also noted that the terms such as "first" and "second" are only used herein to distinguish an entity or operation from another entity or operation, and not necessarily require or imply any actual relationship or order between those entities and operations. Furthermore, terms "include", "contain" or any of their derivatives are intended to convey a non-exclusive connotation, so that a process, a method, an article, or a device including a series of elements not only includes such elements, but also includes other elements that are not listed explicitly, or further includes inherent elements of the process, the method, the article, or the device. If no more limitations are made, an element limited by "include a/an . . . " does not exclude another same element existing in the process, the method, the article, or the device that includes the element.

The embodiments in the present application are all described in a progressive manner, for same or similar parts in the embodiments, reference may be made to these embodiments, and each embodiment focuses on a different from other embodiments.

The embodiments disclosed are described in the foregoing to enable a person of ordinary skill in the art to implement or use the present application. Various modifications to the embodiments are obvious to a person of ordinary skill in the art, and general principles defined in this specification may be implemented in other embodiments without departing from the spirit or scope of the present application. Therefore, the present application will not be limited to the embodiments described in this specification but extends to the widest scope that complies with the principles and novelty disclosed in this specification.

What is claimed is:

1. A terahertz spectral imaging data reconstruction method, comprising:
   scanning a target object according to a first spatial interval and a first time domain sampling period to acquire first terahertz spectral data;
   scanning the target object according to a second spatial interval and a second time domain sampling period to acquire second terahertz spectral data, the first spatial interval is larger than the second spatial interval, and the first time domain sampling period is larger than the second time domain sampling period; and
   reconstructing the second terahertz spectral data on basis of the first terahertz spectral data by using a preset reconstruction method to obtain third terahertz spectral data.

2. The method of claim 1, wherein the first spatial interval comprises a first horizontal interval and a first vertical interval in predetermined coordinate directions perpendicular to each other, the second spatial interval comprises a second horizontal interval and a second vertical interval in the predetermined coordinate directions perpendicular to each other, and the first spatial interval being larger than the second spatial interval comprises any one of:
 the first horizontal interval is equal to the second horizontal interval, and the first vertical interval is larger than the second vertical interval;
 the first horizontal interval is larger than the second horizontal interval, and the first vertical interval is equal to the second vertical interval; or
 the first horizontal interval is larger than the second horizontal interval, and the first vertical interval is larger than the second vertical interval.

3. The method of claim 2, wherein the first horizontal interval is X times the second horizontal interval, the first vertical interval is Y times the second vertical interval, and the second time domain sampling period is 1/Z times the first time domain sampling period, wherein X, Y and Z are both larger than 1, and $$\frac{1}{XY} + \frac{1}{Z} < 1.$$

4. The method of claim 1, wherein the scanning the target object according to the first spatial interval and the first time domain sampling period to acquire the first terahertz spectral data comprises:
 determining a plurality of first location information items of the target object according to the first spatial interval; and
 scanning the target object according to the first time domain sampling period when the target object reaches a first location corresponding to each of the plurality of first location information items, to acquire the first terahertz spectral data.

5. The method of claim 1, wherein the scanning the target object according to the second spatial interval and the second time domain sampling period to acquire the second terahertz spectral data comprises:
 determining a plurality of second location information items of the target object according to the second spatial interval; and
 scanning the target object according to the second time domain sampling period when the target object reaches a second location corresponding to each of the plurality of second location information items, to acquire the second terahertz spectral data.

6. The method of claim 1, wherein the reconstructing the second terahertz spectral data on basis of the first terahertz spectral data by using the preset reconstruction method to obtain the third terahertz spectral data comprises:
 performing a time-frequency transformation on the first terahertz spectral data to obtain a first frequency domain terahertz spectral data, the time-frequency transformation is configured to transform terahertz spectral data from time domain data into frequency domain data;
 performing the time-frequency transformation on the second terahertz spectral data to obtain a transformed second terahertz spectral data; and
 reconstructing the transformed second terahertz spectral data on basis of the transformed first terahertz spectral data by using the preset reconstruction method to obtain the third terahertz spectral data.

7. The method of claim 1, further comprising:
 generating terahertz spectral images and spectral curves of the target object according to the third terahertz spectral data.

8. A terahertz spectral imaging data reconstruction apparatus, comprising:
 a first acquisition module configured to scan a target object according to a first spatial interval and a first time domain sampling period to acquire first terahertz spectral data;
 a second acquisition module configured to scan the target object according to a second spatial interval and a second time domain sampling period to acquire second terahertz spectral data, the first spatial interval is larger than the second spatial interval and the first time domain sampling period is larger than the second time domain sampling period; and
 a reconstruction module configured to reconstruct the second terahertz spectral data on basis of the first terahertz spectral data by using a preset reconstruction method to obtain third terahertz spectral data.

9. The apparatus of claim 8, wherein the first acquisition module comprises:
 a first determining unit configured to determine a plurality of first location information items of the target object according to the first spatial interval; and
 a first scanning unit configured to scan the target object according to the first time domain sampling period when the target object reaches a first location corresponding to each of the plurality of first location information items, to acquire the first terahertz spectral data.

10. The apparatus of claim 8, wherein the second acquisition module comprises:
 a second determining unit configured to determine a plurality of second location information items of the target object according to the second spatial interval; and
 a second scanning unit configured to scan the target object according to the second time domain sampling period when the target object reaches a second location corresponding to each of the plurality of second location information items, to acquire the second terahertz spectral data.

11. The apparatus of claim 8, wherein the reconstruction module comprises:
 a first transforming unit configured to perform a time-frequency transformation on the first terahertz spectral data to obtain a transformed first terahertz spectral data, the time-frequency transformation is configured to transform terahertz spectral data from time domain data into frequency domain data;
 a second transforming unit configured to perform the time-frequency transformation on the second terahertz spectral data to obtain a transformed second terahertz spectral data; and
 a reconstructing unit configured to reconstruct the transformed second terahertz spectral data on basis of the transformed first terahertz spectral data by using the preset reconstruction method to obtain the third terahertz spectral data.

12. The apparatus of claim 8, further comprising:
 a generation module configured to generate the terahertz spectral images and spectral curves of the target object according to the third terahertz spectral data.

13. A computer readable storage medium storing a computer program, wherein when the computer program is being executed by a processor, the following steps are implanted:
   scanning a target object according to the first spatial interval and the first time domain sampling period to acquire the first terahertz spectral data;
   scanning the target object according to the second spatial interval and the second time domain sampling period to acquire the second terahertz spectral data, the first spatial interval is larger than the second spatial interval, and the first time domain sampling period is larger than the second time domain sampling period; and
   reconstructing the second terahertz spectral data on basis of the first terahertz spectral data by using the preset reconstruction method to obtain the third terahertz spectral data.

14. The storage medium of claim 13, wherein the scanning the target object according to the first spatial interval and the first time domain sampling period to acquire the first terahertz spectral data comprises:
   determining a plurality of first location information items of the target object according to the first spatial interval; and
   scanning the target object according to the first time domain sampling period when the target object reaches a first location corresponding to each of the plurality of first location information items, to acquire the first terahertz spectral data.

15. The storage medium of claim 13, wherein the scanning the target object according to the second spatial interval and the second time domain sampling period to acquire the second terahertz spectral data comprises:
   determining a plurality of second location information items of the target object according to the second spatial interval; and
   scanning the target object according to the second time domain sampling period when the target object reaches a second location corresponding to each of the plurality of second location information items, to acquire the second terahertz spectral data.

16. The storage medium of claim 13, wherein the reconstructing the second terahertz spectral data on basis of the first terahertz spectral data by using the preset reconstruction method to obtain the third terahertz spectral data comprises:
   performing a time-frequency transformation on the first terahertz spectral data to obtain a first frequency domain terahertz spectral data, the time-frequency transformation is configured to transform terahertz spectral data from time domain data into frequency domain data;
   performing the time-frequency transformation on the second terahertz spectral data to obtain a transformed second terahertz spectral data; and
   reconstructing the transformed second terahertz spectral data on basis of the transformed first terahertz spectral data by using the preset reconstruction method to obtain the third terahertz spectral data.

17. The storage medium of claim 13, wherein when the computer program is being executed by the processor, the following step is further implanted:
   generating terahertz spectral images and spectral curves of the target object according to the third terahertz spectral data.

18. A computer device, comprising a processor and a memory, wherein the memory stores a computer program, the processor is configured to execute the computer program; by executing the computer program, the method of claim 1 is implemented.

* * * * *